Aug. 8, 1967 J. N. CONWAY ETAL 3,335,415

DIGITAL DISPLAY

Filed July 23, 1964 6 Sheets-Sheet 1

INVENTORS
JAMES N. CONWAY
B. CHARLES GARRETT
BY [signature]
ATTORNEY

Aug. 8, 1967 J. N. CONWAY ETAL 3,335,415

DIGITAL DISPLAY

Filed July 23, 1964 6 Sheets-Sheet 2

TRUTH TABLE

| L1 | L2 | L3 | L4 | L5 | L6 |
|---|---|---|---|---|---|
| 1 | 2 | 4 | 8 | 16 | 32 |

TRUTH TABLE

| PC 1 | PC 2 | PC 3 | PC 4 |
|---|---|---|---|
| 1 | 2 | 4 | 8 |

United States Patent Office 3,335,415
Patented Aug. 8, 1967

3,335,415

DIGITAL DISPLAY

James N. Conway, Granada Hills, and B. Charles Garrett, Sepulveda, Calif., assignors to General Precision, Inc., a corporation of Delaware Filed July 23, 1964, Ser. No. 384,682
6 Claims. (Cl. 340—324)

This invention relates to an electronic system which displays alphabetic and/or numeric digits or symbolic data or the like on a cathode ray tube and, more particularly, to a novel and improved alpha-numeric display system which employs a line segment writing technique.

Such display devices and methods find wide utility in connection with computer and data processing installations for indicating the results of computations and operations performed by digital computers and like apparatus. Necessary requirements for such character display devices are that they operate rapidly, that they be capable of receiving their input data in the form of computer or data processing output signals, and that they produce clear and readily legibile characters.

Briefly described, this invention provides a general purpose display system which operates with a memory device, such as the memory in a digital computer, that will supply digital data in a particular coded form. The digital data is decoded logically and converted to analog signals and presented to cathode ray tube deflection means which constructs data in the form of alpha-numeric characters on the screen of the tube. The displayed data are constructed with a line segment writing technique, and each data symbol consists of up to 12 straight line segments.

It is one object of this invention to provide such an improved character display which generates alpha-numeric characters on a conventional cathode ray tube screen.

It is another object of this invention to provide an improved alpha-numeric character generator which uses a line segment writing technique and consists of up to 12 straight line segments per character.

Another object of this invention is to provide an improved alpha-numeric character display system in which characters may be written at speeds up to 100 kilocycles per second and allowing approximately 10 microseconds per character.

These and other objects of this invention will become apparent to those skilled in the art as the disclosure is made in the following detailed description of a preferred embodiment of the invention as illustrated in the accompanying sheets of drawing in which.

Figures 1, 2:
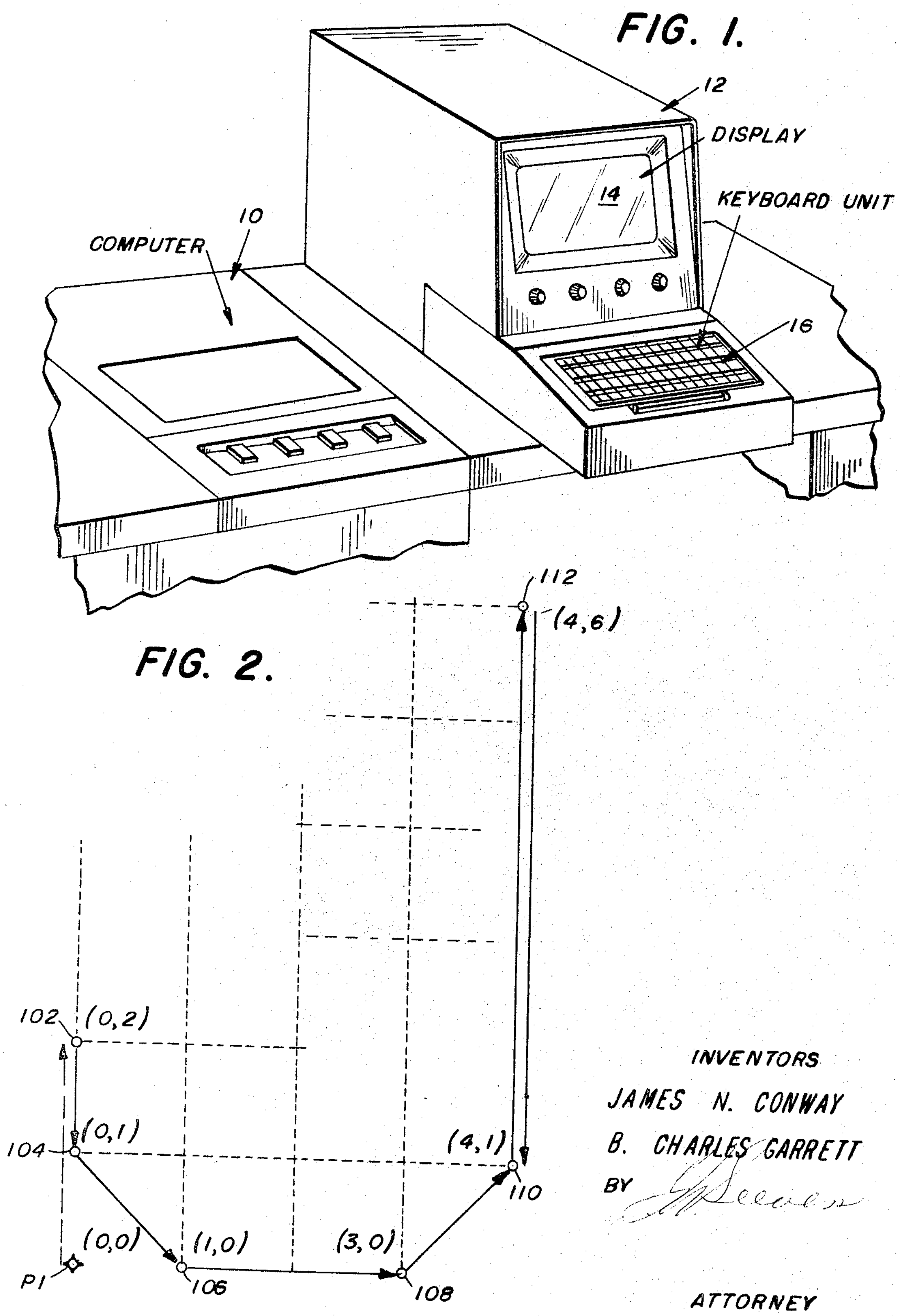
FIGURE 1 is a perspective view of a character display device in conjunction with a keyboard unit and a computer.
FIGURE 2 is a drawing illustrating the positions and paths of the electron beam on the cathode ray tube screen when writing the character J.

Referring to FIGURE 1 which illustrates one embodiment of this invention, specific signals are stored in the memory of a digital computer 10 as shown in FIGURE 1. These signals are presented to the present invention display device 12 which arranges these signals in a specific manner to form characters which are displayed on a screen 14. Signals for the display device may also emanate from a keyboard 16 and these signals also form the specific characters which are displayed on the screen 14. Types of signals from either the computer 10 or the keyboard 16 are usually in a coded form, and for this embodiment the binary code is used.

Figure 3:
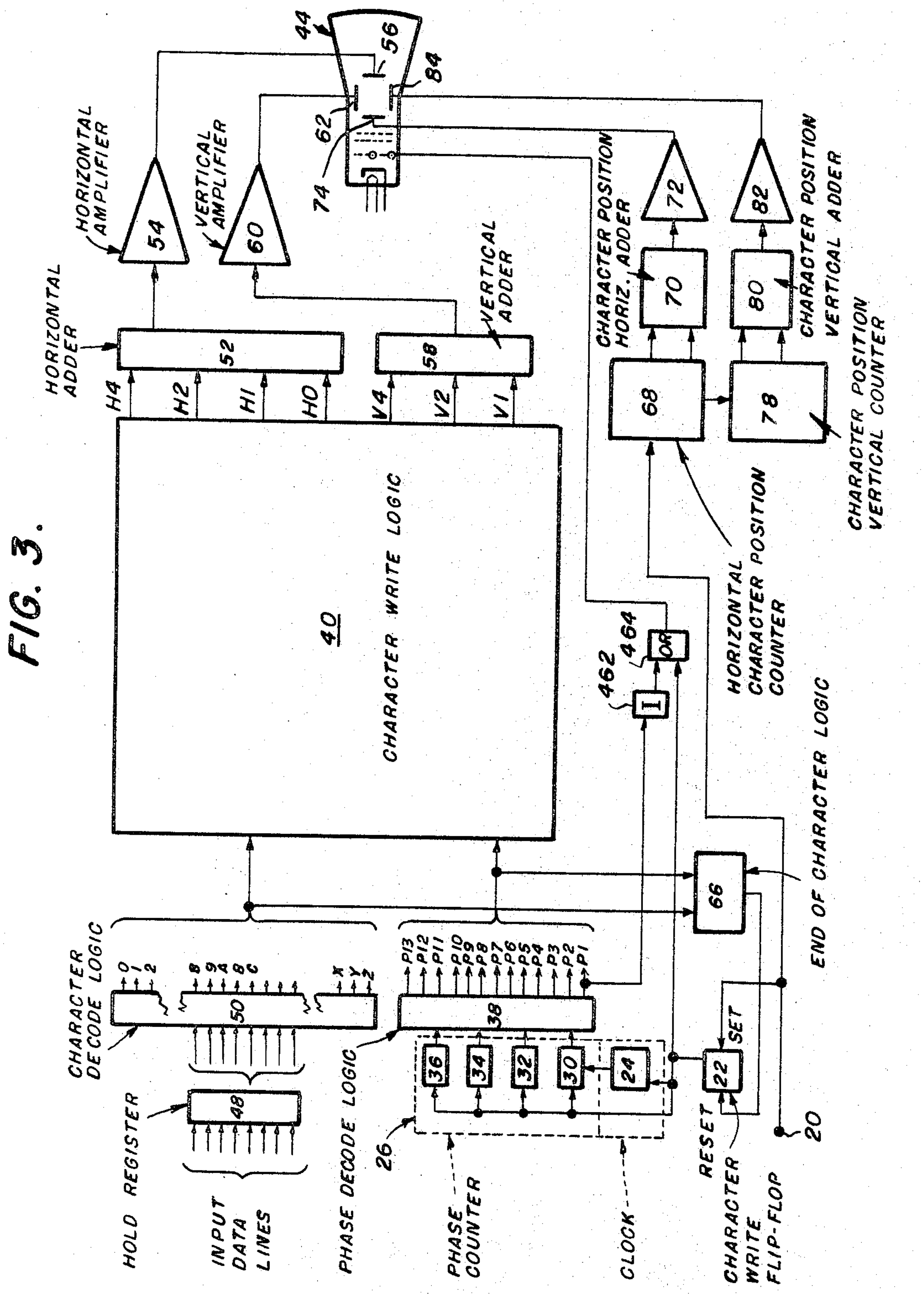
FIGURE 3 is a simple block diagram illustrating one embodiment of the character display.

Turning now to a more detailed description and particularly to the block diagram as depicted in FIGURE 3, there is shown a character write flip-flop 22 which is set by an input control initiated at the terminal 20. The flip-flop 22 is an RS type flip-flop which is well-known in the art. When the flip-flop 22 is set, it starts a character phase oscillator 24, which may be a free running multivibrator and which operates as a clock source for a phase counter 26. The phase counter 26 consists of four flip-flops 30, 32, 34 and 36 connected as successive dividers. The state of flip-flops 30, 32, 34 and 36 of the phase counter 26 are sensed by phase decode logic 38. There are, in this embodiment, 13 outputs from the phase decode logic 38 designated P1 through P13. Each of these outputs represents one line segment movement of the electron beam on the screen 14 of a cathode ray tube 44, and these outputs lead into character write logic 40. The character write logic 40 determines the dirction that the electron beam of cathode ray tube 44 travels during each character phase. The character write logic 40 will be explained in detail later.

Input data is placed into a hold register 48. This data may emanate from a memory or digital computer 10 or the like and is placed in the register 48 by specific commands to said computer 10. One such computer is the well-known LGP–21 computer which is manufactured by General Precision, Inc., Librascope Group. On a specific signal the content in register 48 is placed into the character decode logic 50 which may enable an output which provides signals of a certain alpha-numeric symbol; i.e., 0 through 9 or A through Z.

The purpose of the character write logic 40 is to transform the output appearing at each of the output terminals of the character decode logic 50, as it appears, into a first binary coded signal H0.H1.H2.H4 at a first set of output terminals of the character write logic for controlling horizontal deflections of the cathode-ray tube 44; and into a second binary coded output V1.V2.V4 at a second set of output terminals of the character write logic for controlling vertical deflections of the cathode-ray tube. A succession of binary coded outputs are produced at the first and second sets of output terminals of the character write logic for each output from the character decode logic 50, as each successive phase signals P2 up to P13 are derived from the phase decode logic 38. The number of phase signals so derived depends upon the number of line segments required to form the corresponding character on the screen of the cathode-ray tube 44, as will be described.

For the above purpose, each output terminal of the decode logic circuit 50 is connected to different "or" gates in different sections of the write logic 40, as will be described, so that a distinct code may be achieved at the two sets of output terminals for each successive phase, as measured by the phase signals P2 up to P13.

For example, in the example shown in FIGURE 2, and as will be described in more detail later herein, in order to display the letter "J" on the screen of the cathode-ray tube 44, the following control of the beam in the cathode-ray tube is carried out, and the J terminal of the decode logic 50 is connected accordingly to selected "or" gates in the write logic 40, so as to achieve the desired binary coded output signals, for each successive phase:

| Phase | Horizontal Deflection | Vertical Deflection |
|---|---|---|
| P1 | 0 ($\overline{H0}$, $\overline{H1}$, $\overline{H2}$, $\overline{H4}$) | 2 ($\overline{V1}$, V2, $\overline{V4}$) |
| P2 | 0 ($\overline{H0}$, $\overline{H1}$, $\overline{H2}$, $\overline{H4}$) | 1 (V1, $\overline{V2}$, $\overline{V4}$) |
| P3 | 1 ($\overline{H0}$, H1, $\overline{H2}$, $\overline{H4}$) | 0 ($\overline{V1}$, $\overline{V2}$, $\overline{V4}$) |
| P4 | 3 ($\overline{H0}$, H1, H2, $\overline{H4}$) | 0 ($\overline{V1}$, $\overline{V2}$, $\overline{V4}$) |
| P5 | 4 ($\overline{H0}$, $\overline{H1}$, $\overline{H2}$, H4) | 1 (V1, $\overline{V2}$, $\overline{V4}$) |
| P6 | 4 ($\overline{H0}$, $\overline{H1}$, $\overline{H2}$, H4) | 6 ($\overline{V1}$, V2, V4) |

Outputs from the character write logic 40 are in binary form and are presented to horizontal adder 52 and vertical adder 58. These outputs from the character write logic 40 are designated as H0, H1, H2 and H4 for the binary counts of the horizontal deflection and V1, V2 and V4 for the vertical deflections. The designated horizontal outputs count to 7 in a binary manner with an extra output H0 for wider symbols such as W and M which will be explained later. The designated vertical outputs also count to 7 in a binary manner. Both the horizontal and vertical binary numbers represent the number of units of deflection which are presented to the cathode ray tube 44. All the outputs for horizontal deflection are added together by the character write horizontal adder 52 to produce an analog signal and, for best deflection, is amplified by the character write horizontal amplifier 54 before being applied to the character write horizontal deflection plate 56 of the cathode ray tube 44. Likewise, all outputs for vertical deflection are added together by the character write vertical adder 58 which produces an analog signal and, for best deflection, is amplified by character write vertical amplifier 60 before being applied to the character write vertical deflection plate 62 of the cathode ray tube 44.

End-of-character logic 66 resets character write flip-flop 22 and the flip-flop 22 is again set by the next input control. End-of-character logic 66 is enabled by either one of two separate means; one is when the output of the phase decode logic 38 finishes its count or at P13, and the other is the output from any one of the characters from the character decode logic 50 when it has finished forming its character.

A horizontal character position counter 68 produces a binary step count. The counter 68 has a total of six outputs which produce a binary count to sixty-four. These outputs are introduced into a character position horizontal adder 70 whereby all the binary outputs from the counter 68 are added to form an analog sixty-four count step signal. A complete single character is formed on the cathode ray tube 44 screen 14 during a single count from the counter 68. These signals are amplified by the character position horizontal amplifier 72 and applied to the character position horizontal deflection plate 74 of the cathode ray tube 44.

After the counter 68 has completed its sixty-fourth count, it begins again and also at the end of the sixty-fourth count a character position vertical counter 78 is indexed. This counter 78 is a binary counter with five outputs and represents a binary count to thirty-two and is adapted for positioning the characters to their specific lines. The outputs from counter 78 are added into the character position vertical adder 80 and the output therefrom is amplified by the character position vertical amplifier 82 and applied to the character position vertical deflection plate 84. A complete line of characters is displayed on the cathode ray tube 44 during one count of the character vertical register 78.

Figure 5:
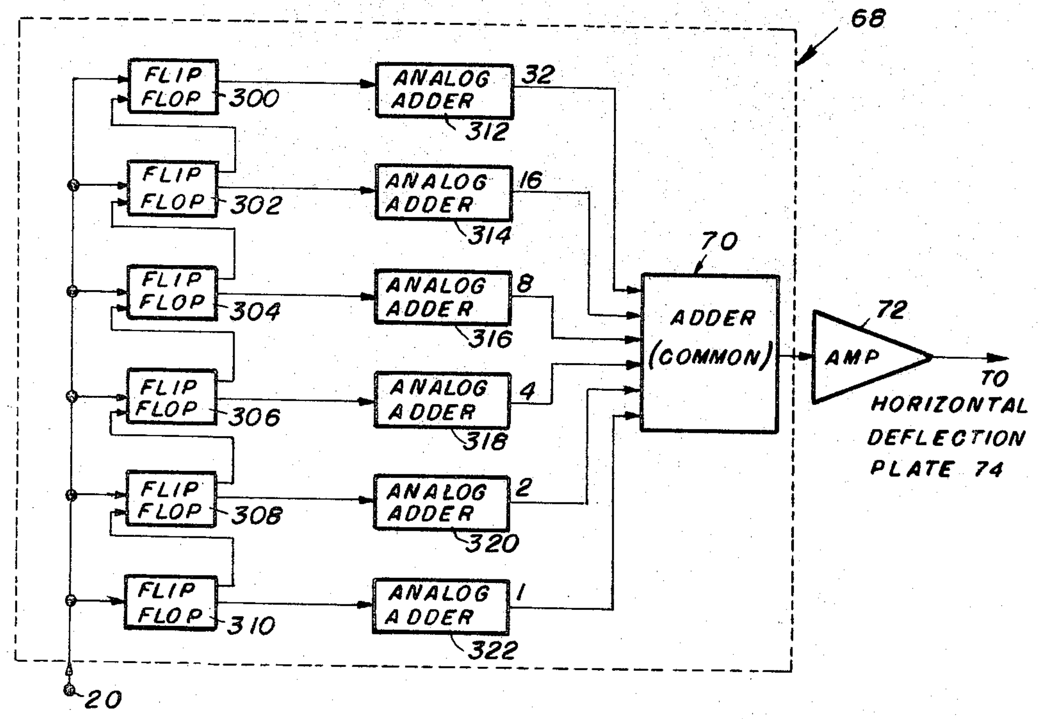
FIGURE 5 is a block diagram illustrating a more detailed view of one embodiment of the logical operation of the horizontal deflection system.

Characters are positioned across the cathode ray tube 44 by character position horizontal counter 68 as shown in FIGURE 5. This counter is indexed with the input control signal from terminal 20. The character position horizontal register 68 is composed of six flip-flops, 300, 302, 304, 306, 308 and 310. These flip-flops are connected as successive dividers and the output of the second flip-flop 302 is twice the value of the first flip-flop 300 and flip-flop 304 is twice the value of the output of 302, etc. The output of each flip-flop in the counter 68 is connected to an analog adder gate. Each analog adder gate draws current in a magnitude proportional to its position in the character counter; thus separate analog adder gates draw one, two, four, eight, sixteen and thirty-two units of current. The currents of all six adder gates are added in adder 70 which represent the state of the character counter. This voltage is amplified by the character position horizontal amplifier 72 and the output is applied to the horizontal character position deflection plate 74. Using this method, a total of sixty-four horizontal character positions is obtained. When a line of information has been completed (i.e., the counter is in the sixty-fourth count), the next input control signal resets the character counter 68 which indexes the character position vertical counter 78 to return the beam to the first character position of the next following line.

The character position vertical counter 78 operates in the same manner as the character position horizontal counter 68 with the exception that it has five flip-flops and counts to thirty-two as a matter of choice for this embodiment.

Figure 6:
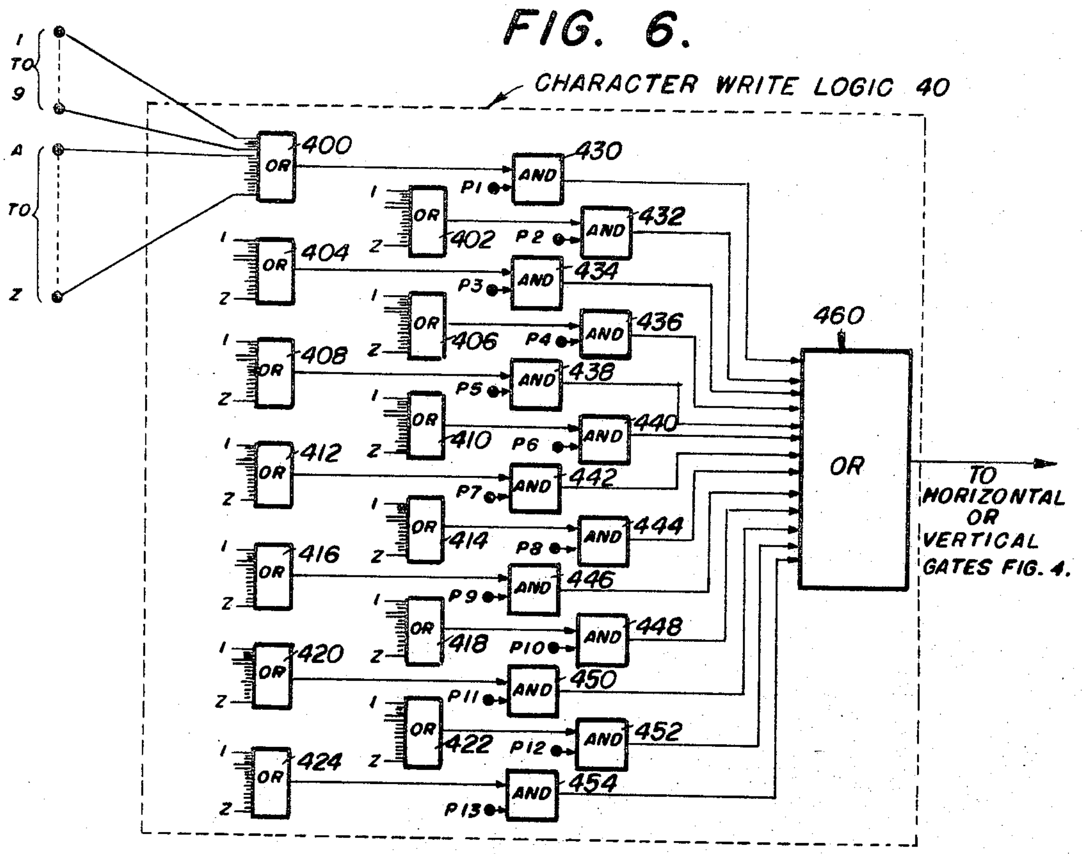
FIGURE 6 is a block diagram illustrating one embodiment of the character write logic for the horizontal deflection.

The character write logic 40 as illustrated in FIGURE 6 has a plurality of OR gates 400, 402, 404, 406, 408, 410, 412, 414, 416, 418, 420, 422, 424. Gate 400, for instance, receives all the character signals from the character decode logic 50, which are required to have a P1 signal, and the output of gate 400 is ANDed with the signal P1 from the phase decode logic 38 by the AND gate 430. Therefore, in accordance with the well-known AND/OR logic principles, AND gate 430 will not be enabled unless there is a character signal from OR gate 400 and a signal P1 from the phase decode logic 38 appearing simultaneously. OR gate 402 also has all the required character signals from the character decode logic 50 ORed together, and the output from gate 402 is ANDed with a P2 signal from the phase decode logic 38 by the AND gate 432. Therefore, AND gate 432 is not enabled unless it has both a signal from the OR gate 402 and P2 of the phase decode logic 38. The same situation occurs with OR gates 404 and AND gate 434 and OR gates 406, 408, 410, 412, 414, 416, 418, 420, 422 and 424 in conjunction with AND gates 436, 438, 440, 442, 444, 446, 448, 450, 452 and 454, respectively.

It should be understood that all the gates 400–424 do not actually receive signals representative of the alpha-numeric characters from the character decode logic 50 but only those which require a specific signal, for instance, OR gate 400 inputs receive no signals during P1 when presented to H1 gate but do during H2. It receives signals from I or T or V or Y; likewise, H4 will receive signals on P1 during C or G or D or Q, etc. Therefore, all OR gates in FIGURE 6 do not actually have all the alpha-numeric characters but only those which need be enabled during specific P times.

Figure 4:
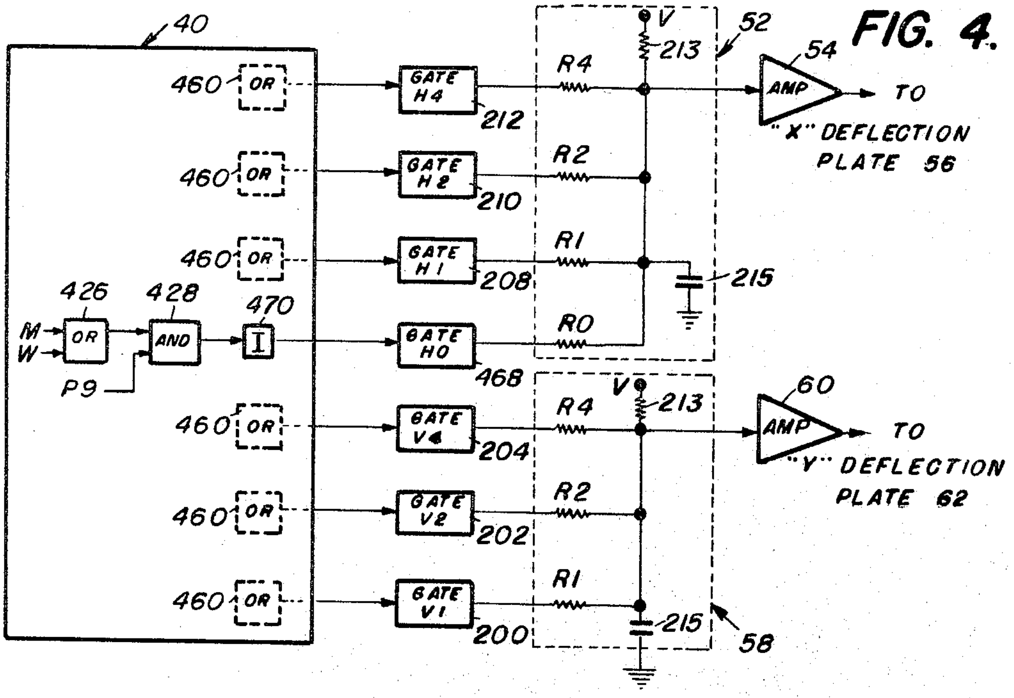
FIGURE 4 is a block diagram illustrating one embodiment of the logical operation of the horizontal and deflection circuits.

All the outputs from the AND gates 430 and 454 are coupled as inputs to OR gate 460 and the output therefrom enables horizontal adder gate (H4) 212 of FIGURE 4. Similar horizontal adder gates 208 and 210 have the same AND/OR logic as does adder gate 212, and the outputs of gates 212, 210 and 208 are presented to character write horizontal adder 52 as previously described. A fourth horizontal adder gate 468 (H0) as shown in FIGURE 4 is required when either of the letters M or W are written because of their larger width. By OR gate 426 the M and W is presented to AND gate 428. The M or W character signal is ANDed with P9 from the phase decode logic 38 and if both signals are present, horizontal adder gate 468 is enabled from the inverted output signal of AND gate 428 which is inverted by the inverter 470. This type inverter is well-known in the art. When adder gate (H0) 468 is enabled, a signal is presented to the horizontal adder 52 which will assure extra width for a larger character (M or W). This is accomplished by actually subtracting one unit of current from that which is present and the electron beam of the cathode ray tube 44 moves one unit to the left.

Similar logic is applied to vertical adder gates 200, 202 and 204 and outputs from these gates are presented to the character write vertical adder 58 as shown in FIGURE 3. The horizontal adder gates 208, 210, 212 and 468 and horizontal adder 52, and vertical adder gates 200, 202 and 204 a vertical adder 58, convert the binary information at their inputs to the analog information required to drive the deflection circuits of the cathode ray tube 44. The vertical deflection circuits 200, 202 and 204 are capable of producing one, two or four units of current for vertical deflection respectively, and when operated in combination they yield from zero to seven units of deflection, according to their binary sum. This is done by the resistors in the adders 52 and 58, and each of these resistors R1, R2 and R4 have a resistance which produces the value and the desired units of current. The horizontal adder gates 208, 210 and 212 are identical to the vertical adder gates 200, 202 and 204 and their binary sum will yield zero to seven units of deflection to the horizontal deflection circuits. One exception on the horizontal adder gates is the adder gate 468 previously mentioned. The purpose of gate 468 as previously stated is to allow M and W, which are wider than other characters, to be extended one unit to the left of the line. This additional unit represents the extreme left of most of the other characters. Actually, when gate 468 is turned on, current flows oppositely through resistor R0 and current actually draws the beam of the cathode ray tube 44 to the left one unit while writing these characters. R0, R1, R2 and R4 of each adder gate 52 and 58 are connected together to form the analog output to the amplifiers 54 and 60; also connected thereto is the capacitor 215 which allows for the outputs to be in the form of an integral ramp rather than in digital stepping signals.

Figure 7:
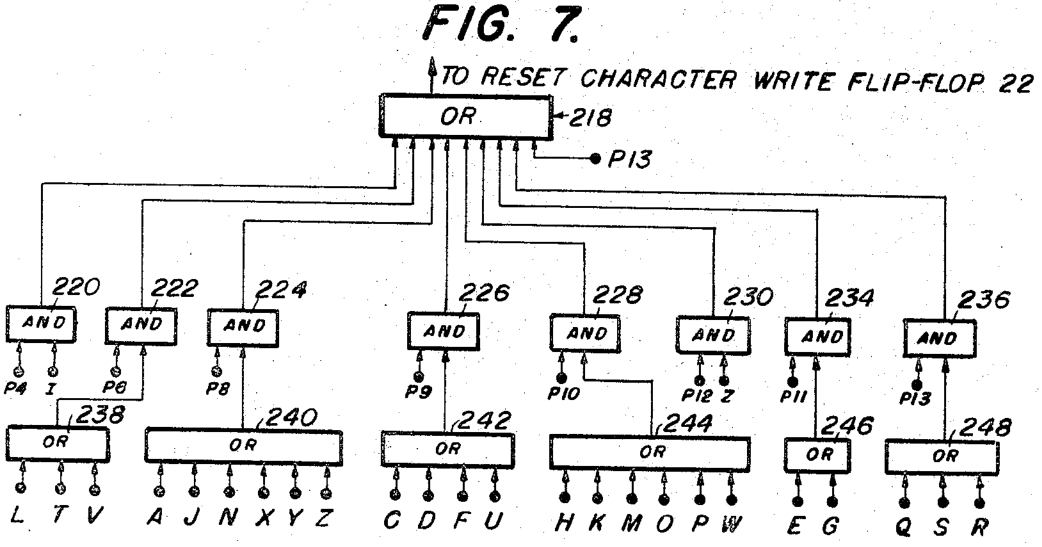
FIGURE 7 is a block diagram illustrating one embodiment of phase decode logic.

End-of-character logic comprises well-known AND/OR logic as used in the art and is illustrated in FIGURE 7 wherein the OR gate 218 receives inputs from AND gates 220, 222, 224, 226, 228, 230, 234 and 236. The AND gate 220 receives two inputs and is enabled when these two inputs are true. One of the inputs is P4 from the phase decode logic 38 and the other is the letter I from the character decode logic. Therefore, when the letter I is true, or enabled, and the phase decode logic counts to P4, the AND gate 220 is enabled and, likewise, the OR gate 218 is enabled. A signal is then generated which resets the character write flip-flop 22. If the letters L, T or V are to be generated for display, each requires six line segments on the cathode ray tube 44; therefore, these signals which emanate from the character decode logic 50 are coupled to OR gate 238 and the output therefrom is coupled to AND gate 222 with the signal P6 from the phase decode logic 38. When both signals appear OR gate 218 is enabled and again the character write flip-flop 22 is reset. The characters A, J, N, X, Y and Z require eight line segments, therefore, they are all coupled to OR gate 240 and the output of OR gate 240 is coupled with P8 to AND gate 224 and if AND gate 224 is enabled, OR gate 218 is enabled and the character write flip-flop 22 is reset. The letters C, D, F and U require nine line segments and are coupled to OR gate 242 and coupled with P9 to AND gate 226 and when AND gate 226 is enabled, OR gate 218 is enabled. OR gate 244 receives the character signals for H, K, M, D, P, W, and OR gate 244 has its output coupled to AND gate 228 which also receives the signal P9. The output of AND gate 228 is coupled to OR gate 218. AND gate 230 receives the signals P12 and Z. AND gate 234 receives the signals P11, and the output from OR gate 246 which has the inputs E and G coupled thereto and lastly for alphabetic characters the AND gate 236 receives the signals P13 and the output from OR gate 248 and the OR gate 248 has for its input the remainder of the alphabet, Q, S and R.

Without going into the detail it must be understood that the numeric characters, as well as any other desired characters, are logically coupled in the same manner but have been excluded for clarity.

Figures 8, 9:
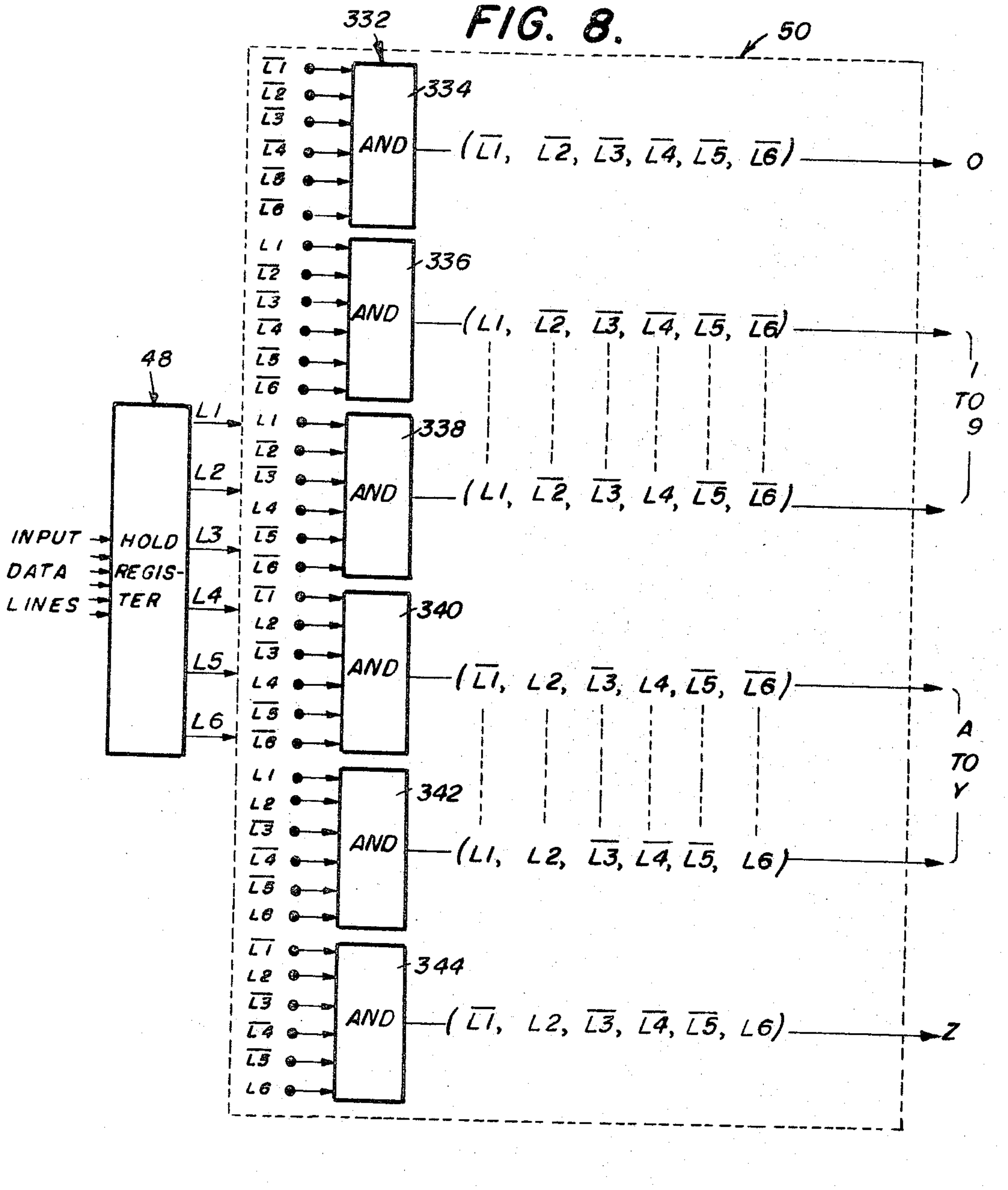
FIGURE 8 is a block diagram illustrating one embodiment of character decode logic.
FIGURE 9 is a truth table used in conjunction with FIGURE 8.

For further explanation of the character decode logic 40 and by way of example, FIGURES 8 and 9, collectively, briefly explain one embodiment of decoding the data from the computer 10 and held in the register 48. The contents of register 48 are presented to the character decode logic 50 through six inputs designated L1, L2, L3, L4, L5 and L6. FIGURE 9 illustrates a truth table wherein L1 represents a binary unit $2^0$, L2 a binary unit $2^1$, L3 a binary unit $2^2$, L4 a binary unit $2^3$, L5 a binary $2^4$, and L6 a binary numeral $2^5$. Therefore, the register 48 can provide 64 various binary signals to the character decode logic 50. Each of these inputs is coupled to a plurality of character gates 332 and, for example, if the character gate 334 is used to represent an output for the character 0, then the terms $\overline{L1}$, $\overline{L2}$, $\overline{L3}$, $\overline{L4}$, $\overline{L5}$, $\overline{L6}$ will appear as inputs to the AND gate 334. If, for example, a "1" is to appear on the output of the character decode logic 40, the AND gate 336 receives an input L1, $\overline{L2}$, $\overline{L3}$, $\overline{L4}$, $\overline{L5}$, and $\overline{L6}$, and if the character decode logic 50 is to present a "9," then the AND gate 338 must have for its input L1, $\overline{L2}$, $\overline{L3}$, L4, $\overline{L5}$, $\overline{L6}$, and if the character decode logic 40 is to present an output at its A terminal, then the gate 340 must have for inputs the terms $\overline{L1}$, L2, L3, $\overline{L4}$, $\overline{L5}$ and $\overline{L6}$. Skipping down to the letter Y in order for the output at the letter Y to be enabled, the AND gate 342 must have on its inputs the terms L1, L2, $\overline{L3}$, $\overline{L4}$, $\overline{L5}$ and L6; and, lastly, by way of example, if the Z is to be enabled, then the AND gate 344 receives the terms $\overline{L1}$, L2, $\overline{L3}$, $\overline{L4}$, $\overline{L5}$ and L6.

This is, by way, example of one code which may be used to convert binary information into digital representation. There are, of course, many codes which may be used. One such might be the well-known Flexowriter code "FL Alpha-Numeric Code" as illustrated and explained in the text Digital Computer Fundamentals by Thomas C. Bartee, published by the McGraw-Hill Company, page 263.

This is, by way of example, for showing various terms that can be enabled to present various outputs and this, of course, only takes up thirty-six of the sixty-four available count, and the remaining counts may be enabled, for example, to provide lower case letters. More character decode logic 50 may be added but for simplicity this embodiment will not include lower case letters.

Figures 10, 11:
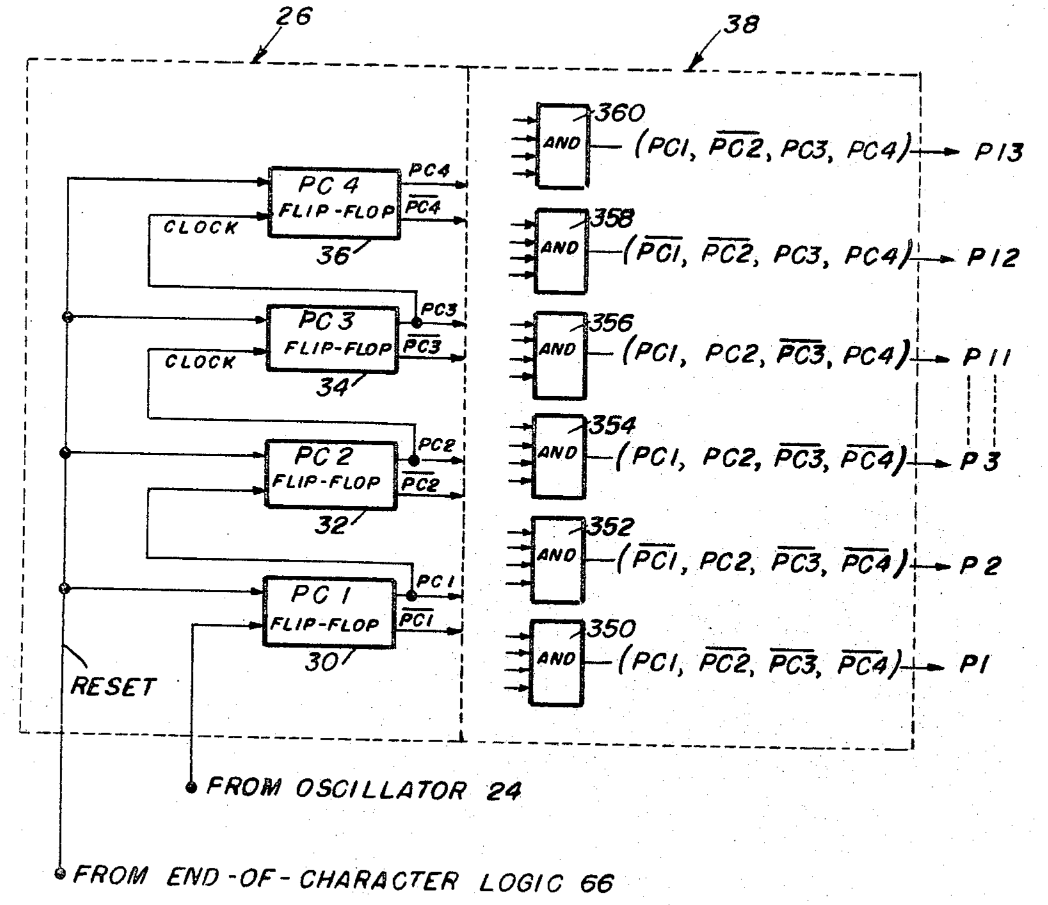
FIGURE 10 is a block diagram illustrating one embodiment of phase decode logic in conjunction with the phase counter.
FIGURE 11 is a truth table used in conjunction with FIGURE 10.

Referring to FIGURES 10 and 11, an example of the phase decode logic 38 and the phase counter 26, the flip-flops 30, 32, 34, 36 are connected as successive dividers whereby the flip-flop 30 is set by the character write flip-flop 22 and the true side from flip-flop 30 will set the flip-flop 32 and it, in turn, will set the flip-flop 34 and the true side therefrom will set the flip-flop 36. The outputs from the phase counter 26 are inputs to the character decode logic 38 whereby the output from flip-flop 30 is designated PC1 and $\overline{PC1}$, and the output from flip-flop 32 is designated PC2 and $\overline{PC2}$, the outputs from flip-flop 34 are PC3 and $\overline{PC3}$, and likewise, the outputs from the flip-flop 36 are PC4 and $\overline{PC4}$. The binary value of the PC signals is shown in the truth table of FIGURE 11. These outputs are introduced into various AND gates within the phase decode logic 38. For example, AND gate 350 which must have as its inputs the following terms: PC1, $\overline{PC2}$, $\overline{PC3}$, $\overline{PC4}$, to be enabled and execute the term P1; and the AND gate 352 is enabled by the terms $\overline{PC1}$, PC2, $\overline{PC3}$, $\overline{PC4}$, to be enabled to produce the term P2; for the AND gate 354 to be enabled and produce the output P3, it must have for its inputs the following terms: PC1, PC2, $\overline{PC3}$, and $\overline{PC4}$; and skipping up to the AND gate 356, for it to be enabled and produce the output P11, it must have for its input terms PC1, PC2, $\overline{PC3}$ and PC4. The AND gate 358 will be enabled and produce the output P12 when the terms $\overline{PC1}$, $\overline{PC2}$, PC3 and PC4 appear, and, lastly, the AND gate 360 must have the terms PC1, $\overline{PC2}$, PC3 and PC4 to produce the output P13. The values, by way of example, of the flip-flop terms PC1, PC2, PC3, PC4 each have the numerical value of the binary value of 1, 2, 4, and 8 respectively as shown by the truth table in FIGURE 9.

In order for the electron beam to flow, the grid of the cathode ray tube 44, FIGURE 3, must be at a less negative value; that is, the less negative the grid is, the more the beam will be unblanked, and if the grid is positive the beam will be unblanked. Therefore, the logic circuitry provides that $\overline{P1}$ or the output of character write flip-flop 22 will unblank the cathode ray tube 44. This is done with the P1 output from the phase decode logic 38 inverted by the inverter 462 ORed with character write signal by the OR gate 464.

To describe one operation of this invention and referring now to FIGURE 2 for an example of character generation, assume that the J character input is activated simultaneously with the appearance of an input control signal at the terminal 20 which sets the character write flip-flop 22. The output of the character phase oscillator 24 is effective during the first half of the oscillatory cycle; therefore, P1 from the phase counter flip-flop 30 is turned on. This brings up P1 and places the cathode ray tube beam in the starting position 102 which for J is two units above the normal position 100 designated as (0, 0). The beam is now at position 102 (0, 2). In other words, vertical gate 202 (V2) is turned on during P1 when a J is being written. When P1 drops and P2 comes up, the cathode ray tube 44 is unblanked and vertical gate 202 is turned off, and vertical gate 200 (V1) is turned on. This logical sequence attempts to step the beam from position 102 to position 104 (0, 1). However, both the horizontal and vertical outputs of the character generator are bypassed by a capacitor 215, FIGURE 4, which converts the voltage step into an approximation of a ramp; therefore, the beam moves with relative slowness and traces a line to the new position. During P3 vertical gate 200 drops and horizontal gate 208 comes up to move the beam diagonally down and to the right one unit each to position 106 (1, 0) which forms the curved portion on the left side of the letter J. During P4 time horizontal gate 210 is activated and horizontal gate 208 remains on which moves the beam to position 108 (3, 0). P5 drops horizontal gate 208 and horizontal gate 210 and brings up horizontal gate 212 and vertical gate 200 to move the beam to position 110 (4, 1). In P6 the beam is deflected to the upper right corner of the character position 112 (4, 6) by horizontal gate 212, vertical gate 202, and vertical gate 204. This draws the vertical straight line at the right side of J. P7 returns the beam to position 110 (4, 1) which retraces the line written in P6. Long, straight lines should be retraced more than once to obtain the same brilliancy as short lines written in the same amount of time. The appearance of P8 when the J line is up causes the end-of-character logic 66 to generate a pulse which resets the character generator to the 0 state where it waits for the next character.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A character display system including: a phase counter having a plurality of output terminals and providing a plurality of distinct outputs at successive ones of said output terminals for each operating cycle of the system; a source of digital data representative of characters to be displayed by the system and having a plurality of output terminals at which signals selectively appear in correspondence with the characters represented by such digital data; write logic circuitry having input terminals coupled to said output terminals of said phase counter and of said source and including a first set of output terminals and a second set of output terminals, and said write logic circuitry including circuit means connected between said write circuitry input terminals and each of said write circuitry output terminals of said first and second sets for developing a series of binary coded outputs across said first set of output terminals and a series of binary coded outputs across said second set of output terminals for each successive output from said phase counter in correspondence with a particular output from said source, and said circuit means, in turn, including a plurality of "or" gates each connected to selected ones of said source output terminals, a corresponding plurality of "and" gates connected to respective ones of said "or" gates and to successive ones of said phase counter output terminals, and a further "or" gate connected to said "and" gate and to a corresponding one of said write circuit output terminals; a first adder circuit coupled to said first set of output terminals of said write logic circuitry for converting the binary coded outputs thereat into corresponding analog signals; a second adder circuit coupled to said second set of output terminals of said write logic circuitry for converting the binary coded outputs thereat into corresponding analog signals; and display means coupled to said first and second adder circuits and responsive to the analog signals therefrom for displaying the characters represented by such analog signals.

2. The system defined in claim 1 in which said source of digital data includes a hold register for receiving and storing digital data representative of characters to be displayed by the system, and character decode logic circuitry coupled to said hold register and having a plurality of output terminals and responsive to the digital data in said hold register for developing a signal at one of its output terminals in correspondence with the character represented by the digital data in said hold register.

3. The system defined in claim 1 in which said display means includes a cathode-ray tube having a horizontal deflection plate coupled to said first adder circuit and having a vertical deflection plate coupled to said second adder circuit.

4. The system defined in claim 3 in which said cathode-ray tube includes a display screen and a second horizontal deflection plate and a second vertical deflection plate, and said system includes character positioning means including a first counter having a stepped signal output coupled to said second horizontal deflection plate of said cathode-ray tube, and a second counter having a stepped signal output coupled to said second vertical deflection plate of said cathode-ray tube.

5. The system defined in claim 2 and which includes end-of-character logic circuitry coupled to said output terminals of said phase counter and to said output terminals of said character decoder logic circuitry for resetting said phase counter after a predetermined number of phase steps depending upon the character being formed on said display means at any particular time.

6. The system defined in claim 1 and which includes capacitor means in said first adder circuit and in said second adder circuit so as to convert digital stepping signals formed therein into respective analog ramp signals.

References Cited

UNITED STATES PATENTS

| | | | |
|---|---|---|---|
| 2,931,022 | 3/1960 | Triest | 340—324.1 |
| 2,942,251 | 6/1960 | Shanahan | 340—324.1 |
| 3,047,851 | 7/1962 | Palmiter | 340—324.1 |
| 3,090,041 | 5/1963 | Dell | 340—324.1 |
| 3,104,387 | 9/1963 | Loshin | 340—324.1 |
| 3,165,729 | 1/1965 | Richman | 340—324.1 |
| 3,205,488 | 9/1965 | Lumpkin | 340—324.1 |
| 3,234,534 | 2/1966 | Todman | 340—324.1 |
| 3,248,725 | 4/1966 | Low et al. | 340—324.1 |
| 3,281,831 | 10/1966 | Yanishevsky | 340—324 |

NEIL C. READ, *Primary Examiner.*

A. J. KASPER, *Assistant Examiner.*